United States Patent [19]

Ono et al.

[11] Patent Number: 4,585,815

[45] Date of Patent: Apr. 29, 1986

[54] STENCIL PRINTING INK

[75] Inventors: Yoshiaki Ono; Takeshi Teranishi, both of Aichi, Japan

[73] Assignee: Pilot Ink Co., Ltd., Aichi, Japan

[21] Appl. No.: 560,303

[22] Filed: Dec. 12, 1983

[30] Foreign Application Priority Data

Dec. 10, 1982 [JP] Japan .................................. 57-217376

[51] Int. Cl.$^4$ ...................... C09D 11/14; C09D 11/10
[52] U.S. Cl. ......................................... 524/23; 106/24;
106/25; 106/26; 524/24; 524/25; 524/26;
524/28; 524/43; 524/44; 524/45; 524/50;
524/55; 524/381; 524/388; 524/446; 524/449;
524/427
[58] Field of Search ................. 524/28, 388, 446, 503,
524/23, 24, 25, 26, 43, 44, 45, 50, 55, 381;
106/24, 25, 26

[56] References Cited

U.S. PATENT DOCUMENTS

| | | | |
|---|---|---|---|
| 2,868,741 | 1/1959 | Chambers | 524/28 |
| 3,284,380 | 11/1966 | Davis | 524/446 |
| 3,361,582 | 1/1968 | Lewis | 106/24 |
| 3,481,889 | 12/1969 | Gibsen | 524/28 |
| 3,483,148 | 12/1969 | Desmarais | 524/388 |
| 3,746,671 | 7/1973 | Zima | 524/26 |
| 4,111,878 | 9/1978 | Ruhf | 524/388 |
| 4,351,754 | 9/1982 | Dupre | 524/446 |
| 4,423,118 | 12/1983 | Corbett | 524/26 |

FOREIGN PATENT DOCUMENTS 1945253  7/1971  Fed. Rep. of Germany ........ 524/28

*Primary Examiner*—C. Warren Ivy
*Attorney, Agent, or Firm*—Sughrue, Mion, Zinn, Macpeak, and Seas

[57] ABSTRACT

A stencil printing ink is described, comprising 0.5 to 20% by weight pigment, 5 to 30% by weight extender pigment, 0.5 to 5% by weight water-soluble polymer (the viscosity of its 10% aqueous solution is at least 40 cps), 3 to 15% by weight (calculated as solids) o/w type resin emulsion, 5 to 20% by weight polyhydric alcohol and water. This ink can produce printed images without being affected by printing conditions such as temperature and application pressure. Thus, it is suitably used in stencil printing for non-professional or unskilled people.

12 Claims, No Drawings

STENCIL PRINTING INK

FIELD OF THE INVENTION

The present invention relates to stencil printing ink and, more particularly, to improved ink for stencil printing of the type that ink is provided in a layer form on a stencil sheet through which letters and figures, for example, are cut, and pressure is applied on the ink layer to penetrate it through the stencil sheet, reproducing the letters and figures on an underlying paper.

BACKGROUND OF THE INVENTION

A printing method of the type as described above is employed for personal use or for the production of small amounts of printed matters since it is convenient compared with industrial printing methods and, thus, is suitable for small-scale printing. In this printing method, however, the degree of pressure being applied, the time for which pressure is applied, and the operation temperature will vary since it is usually performed by unskilled or non-professional ones. Hence, it is desired for printing ink to produce a uniform printed image even if it is applied by such unskilled ones.

Heretofore, in this printing method, w/o type nonvolatile oil-based oily ink and water/glycol-based aqueous ink have been used. These inks, however, have disadvantages in that printed matters are stained because of their low drying speeds. Furthermore, the former oil tends to cause oil bleeding, and the latter ink, when used in a large amount, tends to produce color unevenness (crawling).

SUMMARY OF THE INVENTION

An object of the invention is to provide stencil printing ink which satisfies the requirements as described above and is improved over conventional inks.

It has been found that the object is attained by employing a mixture of pigment, extender pigment, water-soluble polymer, o/w type resin emulsion, polyhydric alcohol, and water which are compounded in specified proportions.

The present invention relates to a stencil printing ink comprising 0.5 to 20% by weight of pigment, 5 to 30% by weight of extender pigment, 0.5 to 5% by weight of water-soluble polymer having a viscosity (determined as a 10% aqueous solution at 20° C.) of at least 40 centipoises (cps), 3 to 15% by weight (calculated as solids) of o/w type resin emulsion, 5 to 20% by weight of polyhydric alcohol, and water.

DETAILED DESCRIPTION OF THE INVENTION

Pigments which are used as the colorant in the invention are organic pigments such as insoluble azo pigment, phthalocyanine pigment, thioindigo pigment, anthraquinone pigment, and quinacridone pigment, fluorescent pigments of the type that fluorescent dye is incorporated in a resin in the form of solid solution, and inorganic pigments such as carbon black and titanium oxide. These pigments may be used in the form of processed pigments which are surface-treated with resins, or aqueous dispersions prepared by dispersing in water by the use of surface active agents. These pigments are used in such amounts as to constitute 0.5 to 20% by weight (calculated as solids) of the ink composition.

The extender pigment acts to impart dilatant flow properties to ink, permitting to produce a printed image which is almost uniform and has a thickly mounted feeling even if ink fluidity changes depending on the temperature at which it is applied, and the pressure being applied and the time for which the pressure is applied are varied, and furthermore, to accelerate the drying to the touch of the printed image. Such extender pigments have a particle size of not more than 10 μm and are substantially colorless and transparent, including kaolin clay, talc, aluminum hydroxide, barium sulfate, mica, silica, calcium carbonate, and magnesium carbonate. The amount of the extender pigment being compounded is 5 to 30% by weight and preferably 10 to 25% by weight of the ink composition.

The water-soluble polymer is used herein to achieve the dispersion and stabilization of the pigment and extender pigment as described above in a vehicle. This water-soluble polymer, however, reduces the action of extender pigment as described above if it is used in a large amount. Thus, taking into account the dispersion and stabilization action of the extender pigment, it is preferred to use polymers of high degree of polymerization in small amounts. Polymers satisfying the requirements as described above are water-soluble polymers having a viscosity (determined as a 10% aqueous solution at 20° C.) of at least 40 cps. Examples are cellulose derivatives such as carboxymethyl cellulose, hydroxymethyl cellulose, hydroxyethyl cellulose and hydroxypropyl cellulose; gums such as gum arabic, tragacanth gum and AG gum; synthetic polymers such as polyvinyl pyrrolidone, polyvinyl alcohol, sodium polyacrylate, and polyethylene oxide; alginic acid derivatives such as sodium alginate and alginic acid glycol ester; proteins such as gelatin and casein; and starches. The amount of the water-soluble polymer being compounded is 0.5 to 5% by weight, preferably 1.0 to 2.5% by weight of the ink composition.

The o/w type resin emulsion is used herein to increase the water resistance and film strength of a printed image. Thus, there are used o/w type resin emulsions which produce a transparent coating film, have a minimum film-forming temperature (hereinafter referred to merely as "MFT") of not more than 10° C. so that they exhibit the above-described action even at low temperatures, and which are small in size, preferably have a particle size of not more than 1 μm. Resins which can be used include polyvinyl acetate, an ethylene-vinyl acetate copolymer, polyacrylate, polymethacrylate, a styrene-acrylate copolymer, a vinyl acetate-acrylate copolymer, polyvinyl chloride, a vinyl chloride-vinyl acetate copolymer, and a styrene-butadiene copolymer. These o/w type resin emulsions are used in such amounts as to constitute 3 to 15% by weight (calculated as solids) of the ink composition.

The polyhydric alcohol is used herein to prevent the stencil sheet from being plugged by drying of the ink at the time of printing. It is necessary for the polyhydric alcohol to be added in an amount of at least 5% by weight. But, if the polyhydric alcohol is added in excess of 20% by weight, it reduces the drying speed of the printed image and causes staining and bleeding. As these polyhydric alcohols, glycerin, ethylene glycol, propylene glycol, diethylene glycol, thiodiethylene glycol or like polyhydric alcohols can be used.

If desired, small amounts of surface active agents, antiseptics, anticorrosives, and so forth may be added.

The use of the present ink permits the formation of a nearly uniform printed image regardless of variations of the pressure being applied and the time for which the pressure is applied, even if it is applied at varied temperatures by non-professional or unskilled one.

In general, as the polymer content of the ink composition of the type as described above is increased, temperature dependency of the viscosity of the ink increases and also its thixotropic properties are enhanced. Thus, the flow of the ink through holes or dots cut in the stencil sheet is greatly affected by the variations of the pressure being applied and the time for which the pressure is applied at the time of printing. In the ink composition of the invention, however, a relatively large amount of extender pigment is dispersed in a vehicle by the action of a small amount of water-soluble polymer having a high degree of polymerization. This extender pigment converts the flow properties of the ink into dilatancy. Thus, the ink composition of the invention exhibits good print suitability which is less affected by the above-described variations of the operation conditions. Other advantages brought about by the extender pigment are that a printed image having a thickly mounted feeling is formed, and that even though polyhydric alcohols of low drying-speed are used in order to prevent the ink on the stencil sheet from drying during printing, the liquid-absorption action of the extender pigment in the printed image brings about quickly the apparent drying, i.e., drying to the touch of the ink, preventing the staining of the printed matters and the occurrence of crawling or bleeding.

The present invention is described in greater detail with reference to the following example. All parts are by weight. The viscosity of the aqueous polymer solution is measured at 20°±2° C.

| Example | parts |
|---|---|
| Sample 1 | |
| Carbon black/surface active agent aqueous dispersion (pigment content: 30%) | 10 |
| Acrylate/styrene copolymer emulsion (solid content: 34%; average particle size: 0.045 μm; MFT: 0° C.) | 30 |
| Basic magnesium carbonate (specific gravity: 1.85) | 20 |
| Sodium alginate (viscosity of 1% aqueous solution: 950–1,100 cps) | 1.0 |
| Ethylene glycol | 20 |
| Water | 19 |
| Sample 2 | |
| Phthalocyanine Blue (C.I. Pigment Blue 15)/surface active agent aqueous dispersion (pigment content: 27%) | 5 |
| Ethylene/vinyl acetate copolymer emulsion (solid content: 50%; average particle size: 0.1 μm or less; MFT: 0° C. or less) | 20 |
| Kaolin clay (specific gravity: 2.59) | 25 |
| 20% Aqueous sodium polyacrylate solution (viscosity of 10% aqueous solution: 400–500 cps) | 2.5 |
| Propylene glycol | 20 |
| Water | 27.5 |
| Sample 3 | |
| Red pigment (C.I. Pigment Red 22)/surface active agent aqueous dispersion (pigment content: 19%) | 10 |
| Acrylate resin emulsion (concentration: 46%; average particle size: 0.07 μm; MFT: 0° C. or less) | 30 |
| Basic magnesium carbonate (specific gravity: 1.85) | 20 |
| Sodium salt of carboxymethyl cellulose (viscosity of 10% aqueous solution: 40 cps) | 5.0 |
| Diethylene glycol | 15 |
| Water | 20 |
| Sample 4 | |
| Green fluorescent pigment/surface active agent aqueous dispersion (pigment content: 40%) | 20 |
| Vinyl acetate/acrylate copolymer emulsion (solid content: 40%; average particle size: 0.1 μm or less; MFT: 0° C.) | 20 |
| Precipitated calcium carbonate (specific gravity: 2.71) | 25 |
| Polyvinyl alcohol (degree of saponification: 86.5–89 mol %; viscosity of 4% aqueous solution: 52 ± 4 cps) | 5.0 |
| Glycerin | 15 |
| Water | 15 |
| Sample 5 | |
| Titanium dioxide/polymethacrylate aqueous dispersion (pigment content: 65%) | 30 |
| Vinyl acetate/acrylate copolymer emulsion (solid content: 40%) | 10 |
| Precipitated calcium carbonate (specific gravity: 2.71) | 20 |
| Hydroxypropyl cellulose (viscosity of 2% aqueous solution: 150–400 cps) | 3.0 |
| Thiodiethylene glycol | 10 |
| Water | 27 |
| Comparative Sample 1 (ink for stencil paper) | |
| Furnace carbon black | 2 |
| Spindle oil | 4 |
| #30 Motor oil | 14 |
| Sorbitan monooleate | 4 |
| Water | 80 |
| Comparative Sample 2 (aqueous ink not containing extender pigment) | |
| Carbon black/surface active agent aqueous dispersion (pigment content: 30%) | 10 |
| Acrylate/styrene copolymer emulsion (solid content: 34%) | 30 |
| Sodium alginate (viscosity of 1% aqueous solution: 950–1,100 cps) | 3.5 |
| Ethylene glycol | 30 |
| Water | 26.5 |
| Comparative Sample 3 (containing a large amount of extender pigment) | |
| Carbon black/surface active agent aqueous dispersion (pigment content: 30%) | 10 |
| Acrylate/styrene copolymer emulsion (solid content: 34%) | 30 |
| Basic magnesium carbonate (specific gravity: 1.85) | 35 |
| Sodium alginate (viscosity of 1% aqueous solution: 950–1,100 cps) | 1.5 |
| Ethylene glycol | 20 |
| Water | 3.5 |
| Comparative Sample 4 (containing a water-soluble polymer having a low degree of polymerization) | |
| Carbon black/surface active agent aqueous dispersion (pigment content: 30%) | 10 |
| Acrylate/styrene copolymer emulsion (solid content: 34%) | 30 |
| Basic magnesium carbonate (specific gravity: 1.85) | 20 |
| Polyvinyl alcohol (degree of saponification: 86.5–89 mol %; viscosity of 10% acqueous solution: 33 cps) | 5.0 |
| Ethylene glycol | 20 |
| Water | 15 |

PREPARATION OF INK

A pigment dispersion, an extender pigment, and a water-soluble polymer were mixed and kneaded by means of a three-roll mill till it became homogeneous. Then, a resin emulsion, a polyhydric alcohol and water were added thereto, and the resulting mixture was stirred and mixed to form an ink composition.

In the case of Comparative Sample 1, the ink was prepared as follows:

The carbon black, spindle oil, #30 motor oil and sorbitan oleate were mixed and kneaded by means of a three-roll mill to prepare a homogeneous paste. Water was gradually added to the homogeneous paste as prepared above while stirring to form a w/o type emulsion ink.

EVALUATION OF INK (1) State of Printed Images

Each ink was applied to a given stencil screen (opening: 82 μm; thickness: 75 μm; wire diameter: 45 μm; open area: 41%). It was printed on a printing paper (JIS P3101, Printing paper A) under the standard printing conditions of temperature 20°–25° C., application pressure about 150 g/cm$^2$, and pressure-application time about 0.5 second. The thus-obtained printed image was examined in connection with five items as shown in Table 1. The results are shown in Table 1.

(2) Printability under Various Conditions

Each ink was printed in the same manner as in (1) above except that the application pressure and pressure-application time were changed as shown in Table 1. The thus-prepared printed images were evaluated and compared. In order to examine the degree of variation in printability with changes in temperature, the one-minute value with a spread meter was measured at three different temperatures. The results are shown in Table 1.

The ink of Comparative Example 4 could not be tested because of poor dispersion.

TABLE 1

|  | Sample | | | | | Comparative Sample | | | |
|---|---|---|---|---|---|---|---|---|---|
|  | 1 | 2 | 3 | 4 | 5 | 1 | 2 | 3 | 4 |
| State of Printed Image: | | | | | | | | | |
| Drying properties | o | o | o | o | o | x | Δ | o | — |
| Bleeding | o | o | o | o | o | x | x | x | — |
| Color unevenness (crawling) | o | o | o | o | o | Δ | x | x | — |
| Thickly mounted feeling | o | o | o | o | o | x | x | o | — |
| Tone | o | o | o | o | o | Δ | Δ | o | — |
| Printability: | | | | | | | | | |
| Pressure-application time: | | | | | | | | | |
| 5 seconds | o | o | o | o | o | x | x | Δ | — |
| Application-pressure: | | | | | | | | | |
| about 25 g/cm$^2$ | o | o | o | o | o | x | x | x | — |
| about 300 g/cm$^2$ | o | o | o | o | o | x | x | Δ | — |
| Temperature dependency (1 minute value as determined with a spread meter: mm) | | | | | | | | | |
| at about 5° C. | 32 | 33 | 37 | 35 | 37 | 33 | 32 | 19 | — |
| at 20–25° C. | 33 | 35 | 38 | 37 | 39 | 37 | 35 | 20 | — |
| at about 40° C. | 35 | 37 | 40 | 39 | 41 | 43 | 41 | 21 | — |

The symbols used in Table 1 are as follows:
(1) State of Printed Image
  Drying Properties (10 minutes after printing)
    o: Printed matter is not stained at all.
    Δ: Printed matter is stained to the extent that ink attaches to the hand.
    x: Printed matter is stained.
  Bleeding
    o: No bleeding is observed.
    x: Imagine lines become larger in breadth and the vehicle bleeds.
  Color Unevenness
    o: The color of printed images is uniform.
    Δ: The color of printed images looks nearly uniform.
    x: Color unevenness is observed.
  Thickly-Mounted Feeling
    o: Printed matter has a thickly mounted feeling.
    x: Printed matter does not have a thickly mounted feeling.
  Tone
    o: Printed images are sharp or of high contract.
    Δ: Printed images are slightly deficient in sharpness.
    x: Printed images are not sharp or of low contrast.
(2) Printability
    o: There is appreciable difference between the finish of printed matter and that as obtained under the standard conditions.
    Δ: There is a slight difference therebetween.
    x: There is a serious difference therebetween.

As can be seen from the above results, the ink of the invention can produce desirable printed images without being affected by printing conditions such as a printing temperature and a printing pressure. Thus, it is suitable for use in stencil printing for nonprofessional or unskilled people.

While the invention has been described in detail and with reference to specific embodiments thereof, it will be apparent to one skilled in the art that various changes and modifications can be made therein without departing from the spirit and scope thereof.

What is claimed is:

1. A stencil printing ink containing, as essential components, and not containing titanium dioxide, 0.5 to 20% by weight of a pigment selected from the group consisting of a carbon black pigment and an organic pigment, 5 to 30% by weight of an extender being substantially colorless and transparent and having a particle size of not more than 10 μm and acting to impart dilatent flow properties to ink, 0.5 to 5% by weight of a water-soluble polymer having a viscosity (as determined as a 10% aqueous solution at 20° C.) of at least 40 centipoises, 3 to 15% by weight (as calculated as solids) of an o/w resin emulsion 5 to 20% by weight of a polyhydric alcohol selected from the group consisting of ethylene glycol, propylene glycol, diethylene glycol, glycerin and thiodiethylene glycol, and the remainder water, the percentages by weight of said components being based on the weight of the entire ink composition.

2. A stencil printing ink as claimed in claim 1, wherein the organic pigment is an insoluble azo pigment, a phthalocyanine pigment, a thioindigo pigment, an indanthrene pigment, or a quinacridone pigment.

3. A stencil printing ink as claimed in claim 1, wherein the water-soluble polymer is a cellulose derivative, a gum, a synthetic polymer, an alginic acid derivative, a protein, or a starch.

4. A stencil printing ink as claimed in claim 3, wherein the cellulose derivative is carboxymethyl cellulose, hydroxymethyl cellulose, hydroxyethyl cellulose or hydroxypropyl cellulose.

5. A stencil printing ink as claimed in claim 3, wherein the gum is gum arabic, tragacanth gum or AG gum.

6. A stencil printing ink as claimed in claim 3, wherein the synthetic polymer is polyvinyl pyrrolidone, polyvinyl alcohol, sodium polyacrylate, or polyethylene oxide.

7. A stencil printing ink as claimed in claim 3, wherein the alginic acid derivative is sodium alginate or alginic acid glycol ester.

8. A stencil printing ink as claimed in claim 3, wherein the protein is gelatin or casein.

9. A stencil printing ink as claimed in claim 1, wherein the o/w resin emulsion has a minimum film-forming temperature of not more than 10° C.

10. A stencil printing ink as claimed in claim 1, wherein the o/w resin emulsion has a resin particle size of not more than 1 μm.

11. A stencil printing ink as claimed in claim 1, wherein the o/w resin emulsion is an emulsion of resin comprising polyvinyl acetate, an ethylene-vinyl acetate copolymer, polyacrylate, polymethacrylate, a styrene-acrylate copolymer, a vinyl acetate-acrylate copolymer, polyvinyl chloride, a vinyl chloride-vinyl acetate copolymer or a styrene-butadiene copolymer.

12. A stencil printing ink as claimed in claim 1, wherein the extender is kaolin clay, talc, aluminum hydroxide, barium sulfate, mica, silica, calcium carbonate or magnesium carbonate.

* * * * *